United States Patent
Ahn et al.

(10) Patent No.: US 9,548,040 B2
(45) Date of Patent: Jan. 17, 2017

(54) IMAGE PROCESSING METHOD AND DISPLAY DEVICE USING THE SAME

(71) Applicant: Samsung Display Co., Ltd., Yongin, Gyeonggi-Do (KR)

(72) Inventors: Kuk-Hwan Ahn, Hwaseong-si (KR); Yu-Kwan Kim, Incheon (KR); Ik Soo Lee, Seoul (KR)

(73) Assignee: Samsung Display Co., Ltd. (KR)

(*) Notice: Subject to any disclaimer, the term of this patent is extended or adjusted under 35 U.S.C. 154(b) by 62 days.

(21) Appl. No.: 14/710,217

(22) Filed: May 12, 2015

(65) Prior Publication Data

US 2016/0180808 A1   Jun. 23, 2016

(30) Foreign Application Priority Data

Dec. 18, 2014   (KR) .................. 10-2014-0183229

(51) Int. Cl.
  *G09G 5/06* (2006.01)
  *H04N 1/62* (2006.01)
  *H04N 9/64* (2006.01)

(52) U.S. Cl.
  CPC ............. *G09G 5/06* (2013.01); *H04N 1/628* (2013.01); *H04N 9/64* (2013.01); *G09G 2340/0457* (2013.01); *G09G 2340/06* (2013.01)

(58) Field of Classification Search
  None
  See application file for complete search history.

(56) References Cited

U.S. PATENT DOCUMENTS

| 7,990,393 B2 | 8/2011 | Higgins | |
| 2009/0046307 A1* | 2/2009 | Kwak | G09G 5/02 358/1.9 |
| 2011/0057950 A1* | 3/2011 | Kim | G09G 5/02 345/602 |

FOREIGN PATENT DOCUMENTS

| KR | 10-2009-0041994 A | 4/2009 |
| KR | 10-2010-0041091 A | 4/2010 |
| KR | 10-2011-0026225 A | 3/2011 |
| KR | 10-2011-0052207 A | 5/2011 |
| KR | 10-2014-0008977 A | 1/2014 |

OTHER PUBLICATIONS

Oliveira, V. A. et al., "Skin Detection using HSV color space," H. Pedrini, & J. Marques de Carvalho, Workshops of Sibgrapi, 2009.*

* cited by examiner

*Primary Examiner* — Kee M Tung
*Assistant Examiner* — Nicholas R Wilson
(74) *Attorney, Agent, or Firm* — Innovation Counsel LLP

(57) ABSTRACT

Provided is an image processing method of processing first red, green, and blue (RGB) data with a display device including a pixel configured with red, green, blue, and white sub-pixels and providing the processed data. The method includes receiving the first RGB data, rendering the first RGB data to generate second RGB data and white (W) data, converting the first RGB data into hue, saturation, and value (HSV) data, obtaining RGB compensation data by using the HSV data on the basis of a lookup table, compensating for the second RGB data by using the RGB compensation data, and outputting the compensated second RGB data and the W data.

12 Claims, 4 Drawing Sheets

| Red LUT | | |
|---|---|---|
| V(value) | M1 | M2 |
| 0 | 0 | 0 |
| 1 | +1 | +3 |
| ⋮ | ⋮ | ⋮ |
| 254 | +5 | +9 |
| 255 | +6 | +10 |

IMAGE PROCESSING METHOD AND DISPLAY DEVICE USING THE SAME

CROSS-REFERENCE TO RELATED APPLICATIONS

This U.S. non-provisional patent application claims priority under 35 U.S.C. §119 of Korean Patent Application No. 10-2014-0183229, filed on Dec. 18, 2014, the entire contents of which are hereby incorporated by reference.

BACKGROUND

The present disclosure herein relates to an image processing method and a display device using the same, and more particularly, to an image processing method using an HSV (hue-saturation-value) color space and a display device using the same.

New techniques are being developed for extending a color gamut of an image displayed on a display device.

Since a skin color among colors displayed on a display device corresponds to a memory color, humans feel more sensitive to a skin color distortion.

Various methods are being suggested to compensate for a distortion of a skin color, but existing methods typically require excessive matrix operations.

Accordingly, there is a need to accurately represent a skin color while reducing an operation amount compared to the existing methods.

SUMMARY

The present disclosure provides an image processing method capable of preventing an image distortion phenomenon occurring at the time of color gamut mapping and a display device using the same.

Embodiments of the present system and method provide image processing methods of processing first red, green, and blue (RGB) data with a display device including a pixel including red, green, blue, and white sub-pixels and providing the processed data, the method including receiving the first RGB data; rendering the first RGB data to generate second RGB data and white (W) data; converting the first RGB data into hue, saturation, and value (HSV) data; obtaining RGB compensation data by using the HSV data on the basis of a lookup table; compensating for the second RGB data by using the RGB compensation data; and outputting the compensated second RGB data and the W data.

In some embodiments, the method may further include determining whether the hue and saturation data of the HSV data are respectively included in first and second ranges.

In some embodiments, the obtaining of the RGB compensation data may be executed in a case where the hue and saturation data of the HSV data respectively satisfy the first and second ranges.

In some embodiments, the first range may be about 28°≤H°≤about 32° where H° is a value obtained by converting the hue data into an angle.

In some embodiments, the second range may be 0≤S≤255 where S is a value obtained by converting the saturation data into an 8-bit value.

In some embodiments, the lookup table may store first and second intermediate values corresponding to each of a plurality of levels of the value data of the HSV data for each color.

In some embodiments, the obtaining of the RGB compensation data may include obtaining the first and second intermediate data corresponding to the value data for each color from the lookup table; and calculating the RGB compensation data for each color using the first and second intermediate data obtained for each color.

In some embodiments, the RGB compensation data for each color is calculated by the following Equation (1), $$\Delta = M1 \times S/St + M2 \times (St-S)/St \qquad \text{Equation (1)}$$

where Δ denotes the RGB compensation data for each color, M1 denotes the first intermediate data, M2 denotes the second intermediate data, S denotes the saturation data of the HSV data, and St denotes a maximum value among saturation data included in the second range.

In some embodiments, the compensating for the second RGB data may include applying the second RGB data with the RGB compensation data.

In some embodiments, the second RGB data may be compensated according to the following Equation (2), $$RoGoBo = RiGiBi + \Delta R\Delta G\Delta B \qquad \text{Equation (2)}$$

where RoGoBo denotes the compensated second RGB data, RiGiBi denotes the second RGB data, and ΔRΔGΔB denotes the RGB compensation data.

In some embodiments, the rendering of the first RGB data and the converting of the first RGB data into the HSV data may be executed simultaneously.

In some embodiments, the compensated second RGB data and the W data may respectively correspond to the red, green, blue, and white sub-pixels.

In some embodiments of the present system and method, image processing apparatuses for processing first red, green, and blue (RGB) data with a display device including a pixel including red, green, blue, and white sub-pixels and providing the processed data, the apparatus including: a rendering unit configured to render the first RGB data to generate second RGB data and white W data; an RGB-HSV converting unit converting the first RGB data into hue, saturation, and value (HSV) data; a calculating unit configured to obtain RGB compensation data by using the HSV data on the basis of a lookup table; and a color compensating unit configured to compensate for the second RGB data by using the RGB compensation data and to output the compensated RGB data and the W data.

BRIEF DESCRIPTION OF THE DRAWINGS

The accompanying drawings provide a further understanding of the present system and method and are incorporated in and constitute a part of this specification. The drawings illustrate exemplary embodiments of the present system and method and, together with the description, serve to explain principles of the present system and method. In the drawings.

DETAILED DESCRIPTION OF THE EMBODIMENTS

Objects, other objects, features and advantages of the present disclosure will become more easily understood to those of ordinary skill in the art when the following detailed description and accompanying drawings are considered in conjunction. The present system and method may, however, be embodied in different forms and are not limited to the embodiments set forth herein. Rather, these embodiments are provided to help convey the scope of the present system and method to those skilled in the art.

Figure 1:
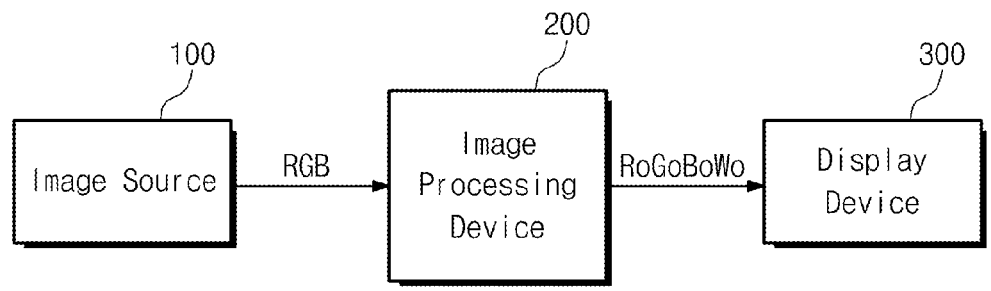
FIG. 1 is a block diagram of a display system according to an embodiment of the present system and method.

FIG. 1 illustrates a block diagram of a display system.

Referring to FIG. 1, a display system may include an image source 100, an image processing device 200, and a display device 300.

The image source 100 may output RGB data RGB including red, green, and blue data. The RGB data RGB is data of an RGB color space having red, green, and blue colors as basic configurations. The RGB color space forms a spectrum of colors by adding various intensities of the three primary colors of light, namely, red, green, and blue to one another. When equal intensities of the primary colors are added a grey or white color is formed.

The image processing device 200 may receive the RGB data RGB output from the image source 100. The image processing device 200 may render and compensate for the received RGB data RGB to generate RGBW (red, green, blue, and white) data RoGoBoWo and to provide the RGBW data RoGoBoWo to the display device 300. The display device 300 may include red, green, blue, and white sub-pixels as one pixel. A detailed description of the image processing device 200 is provided below in relation to FIG. 2.

The display device 300 may include a driving unit (not illustrated) and a display panel (not illustrated). The driving unit may include a timing controller, a data driver, and a gate driver. The driving unit receives the rendered and compensated RGBW data RoGoBoWo from the image processing device 200, converts the RGBW data RoGoBoWo into data voltages, and outputs the data voltages to the display panel.

The display panel displays an image corresponding to the data voltages. The display panel may include various display panels such as an organic light emitting display panel, a liquid crystal display panel, a plasma display panel, an electrophoretic display panel, and an electrowetting display panel.

Figure 2:
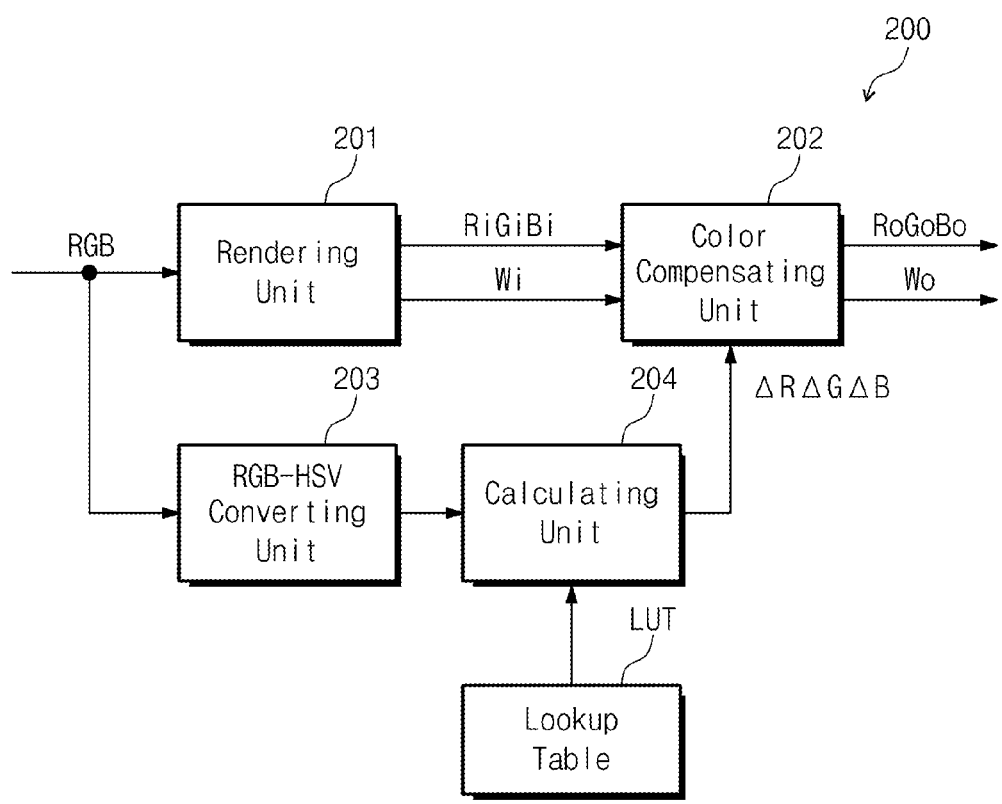
FIG. 2 is a block diagram of an image processing device according to an embodiment of the present system and method.

FIG. 2 is a block diagram of an image processing device.

Referring to FIG. 2, the image processing device 200 may include a rendering unit 201, a color compensating unit 202, an RGB-HSV converting unit 203, a calculating unit 204, and a lookup table LUT.

First, the image processing device 200 may receive first RGB data RGB from the image source 100. In the present specification, the first RGB data RGB represents RGB data received by the image processing device 200 from the image source 100.

The rendering unit 201 renders the received first RGB data RGB to generate second RGB data RiGiBi and white W data Wi. In detail, the rendering unit 201 renders the first RGB data RGB into the second RGB data RiGiBi and W data Wi according to a sub-pixel layout provided in the display device 300. The generated second RGB data RiGiBi and W data Wi are output to the color compensating unit 202. The color compensating unit 202 compensates for the received second RGB data RiGiBi and W data Wi using compensation data $\Delta R\Delta G\Delta B$. A more detailed description of the operations of the color compensating unit 202 is provided later.

The RGB-HSV converting unit 203 may convert the first RGB data RGB into HSV data. The HSV data is data in a color space having hue, saturation, and value as basic configurations. The HSV data may include hue data H, saturation data S, and value data V. The hue data H has hue angle information in the range of 0° to 360° in the HSV color space. The HSV color space configures colors using hue H, saturation S, and value data V based on the intuitive vision of a human. The RGB-HSV converting unit 203 may output the HSV data to the calculating unit 204.

The calculating unit 204 may obtain the RGB compensation data $\Delta R\Delta G\Delta B$ based on the information in lookup table LUT and the received HSV data. The calculating unit 204 may first determine whether the hue data H of the HSV data is in a first range and whether the saturation data S is in a second range to thereby determine whether the received HSV data is a compensation target.

The first range may be a range corresponding to a human skin color. For example, the first range may be about $28° \leq H° \leq$ about $32°$. Here, H denotes hue data converted into an angle.

The second range may be about $0 \leq S \leq$ about 255. Here, S may denote a saturation data value when the number of bits of the saturation data S is 8.

The first and second ranges may be set to various ranges according to a target color, or be empirically determined in consideration of human mental recognition and characteristics of the display device 300, but are not limited to the foregoing embodiments.

When the HSV data is included in the first and second ranges, the calculating unit 204 may obtain first and second intermediate data corresponding to the value data V of the HSV data from the lookup table LUT where the first and second intermediate data are stored for each color. The first and second intermediate data are gradation values used for obtaining the RGB compensation data $\Delta R\Delta G\Delta B$, and may be stored in the lookup table LUT as various values according to the hue to be compensated, a sub-pixel layout of the display device 300, or a driving scheme of the display device 300. In the present embodiment, the first intermediate data is gradation data corresponding to a white color, and the second intermediate data is gradation data corresponding to a human skin color.

The calculating unit 204 may apply the obtained first and second intermediate data to an equation to obtain the RGB compensation data $\Delta R\Delta G\Delta B$. A more detailed description of the operations of the calculating unit 204 is described below in relation to FIGS. 3 and 4. The calculating unit 204 may output to the color compensating unit 202 the RGB compensation data $\Delta R\Delta G\Delta B$ obtained by using the first and second intermediate data.

The color compensating unit 202 may receive the second RGB data RiGiBi and the W data Wi from the rendering unit 201 and the RGB compensation data $\Delta R\Delta G\Delta B$ from the calculating unit 204. The color compensating unit 202 may compensate for the second RGB data RiGiBi by operating the second RGB data RiGiBi with the RGB compensation data $\Delta R\Delta G\Delta B$. For example, the second RGB data RiGiBi may be compensated by applying the RGB compensation data $\Delta R\Delta G\Delta B$ according to the following Equation (1).

$$RoGoBo = RiGiBi + \Delta R\Delta G\Delta B \qquad \text{Equation (1)}$$

where RoGoBo denotes the compensated second RGB data, RiGiBi denotes the second RGB data, and ΔRΔGΔB denotes the RGB compensation data.

In other words, the color compensating unit 202 may compensate the second RGB data RiGiBi by adding the RGB compensation data ΔRΔGΔB to the second RGB data RiGiBi. Here, adding the second RGB data RiGiBi and the RGB compensation data ΔRΔGΔB means addition of data corresponding to the same color among color data included in the second RGB data RiGiBi and the RGB compensation data ΔRΔGΔB.

For example, when second red data Ri of the second RGB data RiGiBi is 100, second green data Gi is 70, second blue data Bi is 80, red compensation data ΔR of the RGB compensation data ΔRΔGΔB is +3, green compensation data ΔG is −1, and blue compensation data ΔB is −5, second red data Ro of the compensated second RGB data RoGoBo is 103, second green data Go is 69, and second blue data Bo is 75.

The color compensating unit 202 may output the compensated second RGB data RoGoBo and W data Wi=Wo to the display device 300. The display device 300 may convert the compensated second RGB data RoGoBo and W data Wo into data voltages for use by the red, green, blue, and white sub-pixels, respectively, to display an image.

The image processing device 200 herein, as describe above, converts the first RGB data RGB into HSV data and then obtains the RGB compensation data ΔRΔGΔB in the HSV color space. A reason is that since a color gamut of a display panel is limited, a process that maps the RGB data, which is a display signal, to the color gamut of the display panel reduces the operation amount for compensating a color distortion. In contrast, if the RGB data is compensated in the RGB color space (i.e., based on all of red, green, and blue), an excessive operation amount would be necessary.

Accordingly, the image processing device 200 in the present specification obtains the RGB compensation data for compensating for the RGB data by converting the RGB data into HSV data, which does not require an excessive operation amount.

However, the image processing device 200 in the present specification does not obtain HSV compensation data for the HSV data, but directly obtains RGB compensation data ΔRΔGΔB. This is because re-converting the HSV data into the RGB data would require an excessive operation amount and time. Thus, instead, the image process device 200 obtains the RGB compensation data ΔRΔGΔB using the HSV data and directly applies the RGB compensation data ΔRΔGΔB to the rendered RGB data RiGiBi. Accordingly, since a step of re-converting the HSV data into the RGB data is omitted, the image processing device 200 of the present specification is advantageous in terms of image processing speed and operation amount when compared to existing techniques.

Figures 3, 4:
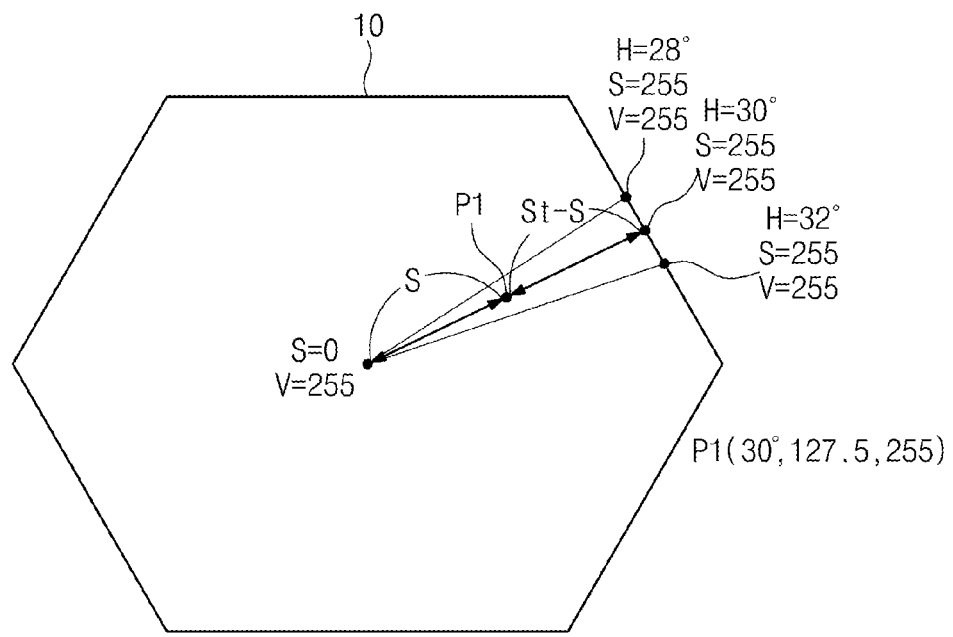
FIG. 3 illustrates an example of an HSV color space.
FIG. 4 illustrates a look-up table of red data in which first and second intermediate data respectively corresponding to levels of value data among HSV data are stored according to an embodiment of the present system and method.

FIG. 3 illustrates an embodiment of an HSV color space. FIG. 4 illustrates a lookup table of red data where first and second intermediate data respectively corresponding to levels of value data V among HSV data are stored.

Referring to FIG. 3, when the RGB data is converted into the HSV data, the HSV data may correspond to a specific point P1 in an HSV color space 10. As an example, when hue data H of the HSV data is about 30°, saturation data S is about 127.5, and value data V is about 255, the HSV data may correspond to the first point P1 in the HSV color space as illustrated in FIG. 3.

As described above in relation to FIG. 2, the calculating unit 204 may determine whether the hue data H and the saturation data S of the HSV data are respectively included in the first and second ranges. In the present embodiment, the first range may be about 28°≤H°≤about 32°, and the second range may be about 0≤S≤255. Since the first point P1 is included in the first and second ranges, the calculating unit 204 may determine the HSV data corresponding to the first point P1 as a compensation target. The calculating unit 204 may obtain the first and second intermediate data on the basis of the lookup table LUT using the value data V of the HSV data determined as the compensation target.

Referring to FIG. 4, the lookup table LUT stores first and second intermediate data M1 and M2 respectively corresponding to levels of the value data V. When determining that the HSV data is included in the first and second ranges, the calculating unit 204 may reference the lookup table LUT to obtain the first and second intermediate data M1 and M2 corresponding to the levels of the value data V.

As FIG. 4 shows, the lookup table LUT stores first and second intermediate data M1 and M2 respectively corresponding to a plurality of levels of the value data V. The number of levels of the value data V may be determined according to the number of bits of the value data V. FIG. 4 shows a lookup table LUT for 8-bit value data V. Accordingly, the value data V may have a total of 256 levels, and the lookup table LUT may store the first and second intermediate data M1 and M2 respectively corresponding to the 256 levels.

The lookup table LUT may be a 3-dimensional lookup table storing the first and second intermediate data M1 and M2 for red, green, and blue data. Although FIG. 4 shows only a red data lookup table for convenience of explanation, green and blue data lookup tables may also exist.

When the lookup table LUT illustrated in FIG. 4 is referenced, since the value data of the HSV data corresponding to the first point P1 is 255, the calculating unit 204 obtains +6 as the first intermediate data M1 and +10 as the second intermediate data M2.

The calculating unit 204 may apply the obtained first and second intermediate data to the following Equation (2) to obtain the RGB compensation data ΔRΔGΔB.

$$\Delta = M1 \times S/St + M2 \times (St-S)/St \qquad \text{Equation (2)}$$

where, Δ denotes the RGB compensation data for each color, M1 denotes the first intermediate data, M2 denotes the second intermediate data, S denotes the saturation data of the HSV data, and St denotes a maximum value of the saturation data included in the second range.

Accordingly, when the HSV data corresponding to the first point P1 is applied to Equation (2), 6×127.5/255+10×(255−127.5)/255 is resulted and the red compensation data ΔR becomes +8.

Similarly, the calculating unit 204 may obtain green and blue compensation data ΔG and ΔB by obtaining the first and second intermediate data M1 and M2 from lookup tables respectively corresponding to green and blue data, and by applying the first and second intermediate data M1 and M2 to Equation (2).

The calculating unit 204 may output the obtained RGB compensation data ΔRΔGΔB to the color compensating unit 202. The color compensating unit 202 may compensate for the second RGB data RiGiBi by applying the RGB compensation data ΔRΔGΔB to the second RGB data RiGiBi. In particular, the color compensating unit 202 may compensate for the second RGB data RiGiBi by applying the received RGB compensation data ΔRΔGΔB and the second RGB data RiGiBi to Equation (1).

For example, when the second red data Ri included in the second RGB data RiGiBi is +3 and the red compensation data ΔR is +8, the color compensating unit 202 may compensate for the second red data Ri by adding the second red data Ri and the red compensation data ΔR according to Equation (1). Accordingly, the compensated second red data Ro may have a gradation value of +11. Similarly, the second green and blue data Gi and Bi included in the second RGB data RiGiBi are also compensated by adding the green and blue compensation data ΔG and ΔB output from the calculating unit 204 to the second green data Gi and second blue data Bi, respectively.

The color compensating unit 202 may output the compensated second RGB data RoGoBo and W data Wo to the display device 300. The compensated second RGB data RoGoBo and W data Wo may respectively correspond to red, green, blue, and white sub-pixels of the display device 300. The display device 300 may convert the compensated second RGB data RoGoBo and W data Wo into data voltages respectively corresponding to the red, green, blue, and white sub-pixels to display an image.

Figure 5:
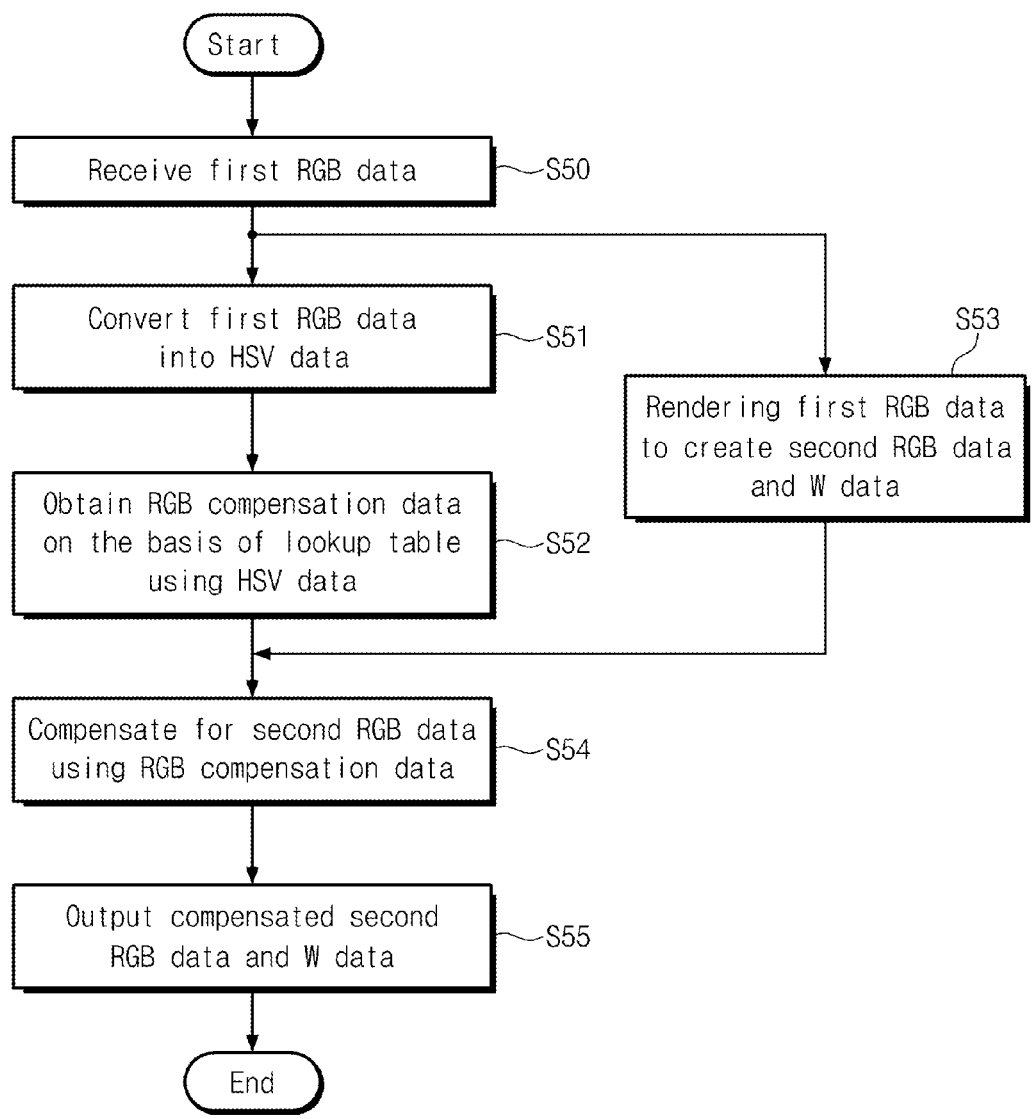
FIG. 5 is a flow chart illustrating an image processing method according to an embodiment of the present system and method.

FIG. 5 is a flow chart illustrating an image processing method. Each step of the flow chart may be executed by each element of the image processing device 200 described in relation to FIG. 2, and overlapping descriptions in relation to FIGS. 1 to 4 are omitted below.

Firstly, the image processing device 200 may receive first RGB data RGB (operation S50).

Next, the image processing device 200 may convert the first RGB data RGB into HSV data (operation S51). This is because, as described above in relation to FIG. 2, an operation amount necessary for color compensation in an HSV color space is less than that necessary for color compensation in an RGB color space.

Next, the image processing device 200 may obtain the RGB compensation data ΔRΔGΔB based on the basis of the lookup table LUT using the received HSV data (operation S52). The lookup table LUT may be a 3-dimensional lookup table storing the first and second intermediate data M1 and M2 corresponding to each level of the value data V of the HSV data for each of the red, green, and blue data. The image processing device 200 obtains the first and second intermediate data M1 and M2 corresponding to the value data V of the HSV data for each of the red, green, and blue data, and applies the first and second intermediate data M1 and M2 to Equation (2) to obtain the RGB compensation data ΔRΔGΔB.

During the same time period in which operations S51 and/or S52 are performed, the image processing device 200 may execute an operation S53 for rendering the first RGB data RGB to generate the second RGB data RiGiBi and W data Wi.

The image processing device 200 may compensate for the second RGB data RiGiBi using the second RGB data RiGiBi and the RGB compensation data ΔRΔGΔB obtained through operations S51 to S53 (operation S54). The image processing device 200 may compensate for the second RGB data RiGiBi by applying the second RGB data RiGiBi and the RGB compensation data ΔRΔGΔB to Equation (1) to perform an addition operation.

As a result, the image processing device 200 may output the compensated second RGB data RoGoBo and W data Wo (operation S55).

The image processing device 200 outputs the compensated second RGB data RoGoBo and W data Wo to the display device 300, and the display device 300 displays an image using the compensated second RGB data RoGoBo and W data Wo.

Figure 6:
FIG. 6 illustrates a sub-pixel layout of a display device according to an embodiment of the present system and method.

FIG. 6 illustrates a sub-pixel layout of a display device.

Referring FIG. 6, the display device 300 herein may include red, green, blue, and white sub-pixels SP1 to SP4 as one pixel P. Each of sub-pixels SP1 to SP4 may correspond to the second RGB data RoGoBo and W data Wo compensated by the image processing device 200. In detail, the second red data Ro, the second green data Go, and the second blue data Bo included in the compensated second RGB data RoGoBo may respectively correspond to a first sub-pixel SP1, a third sub-pixel SP3, and a fourth sub-pixel SP4. In addition, the W data Wo may correspond to the second sub-pixel SP2. The display device 300 displays an image by converting data corresponding to each of the sub-pixels SP1 to SP4 into data voltages and outputting the data voltages to the display panel.

For convenience of explanation, the drawings in which the embodiments are shown are described separately, but it is also possible to design a new embodiment to be realized by combining embodiments described in relation to each drawing. As can be seen from the foregoing, the display device in accordance with the present system and method is not limited to the configurations and methods of the embodiments described above. Rather, the entirety of or a part of the embodiments may be configured to be selectively combined such that various modifications of the embodiments may be implemented.

According to embodiments of the present system and method, a phenomenon in which an image (in particular, a memory color such as a skin color) is distorted can be prevented.

In addition, according to embodiments of the present system and method, since RGB compensation data is directly obtained using HSV data, it is not necessary to re-convert the HSV data into RGB data, and accordingly, an operation amount and a memory usage can be reduced.

The above-disclosed subject matter is illustrative and not restrictive, and the appended claims are intended to cover all such modifications, enhancements, and other embodiments that fall within the spirit and scope of the present system and method.

What is claimed is:

1. An image processing method of processing first red, green, and blue (RGB) data with a display device including a pixel including red, green, blue, and white sub-pixels and providing the processed data, the method comprising:
   receiving the first RGB data;
   generating second RGB data and white (W) data by rendering the first RGB data;
   converting the first RGB data into hue, saturation, and value (HSV) data;
   obtaining RGB compensation data by using the HSV data on the basis of a lookup table, wherein the lookup table stores first and second intermediate values corresponding to each of a plurality of levels of the value data of the HSV data for each color;
   compensating for the second RGB data by using RGB compensation data; and
   outputting the compensated second RGB data and the W data.

2. The method of claim 1, further comprising determining whether the hue and saturation data of the HSV data are respectively included in first and second ranges.

3. The method of claim 2, wherein the obtaining of the RGB compensation data is executed when the hue and saturation data of the HSV data respectively satisfy the first and second ranges.

4. The method of claim 3, wherein the first range is $28 \leq H° \leq 32°$ where H is a value obtained by converting the hue data into an angle.

5. The method of claim 3, wherein the second range is $0 \leq S \leq 255$ where S is a value obtained by converting the saturation data into an 8-bit value.

6. The method of claim 2, wherein the obtaining of the RGB compensation data comprises:
  obtaining the first and second intermediate data corresponding to the value data for each color from the lookup table; and
  calculating the RGB compensation data for each color using the first and second intermediate data obtained for each color.

7. The method of claim 6, wherein the RGB compensation data for each color is calculated by, $$\Delta = M1 \times S/St + M2 \times St - S/St,$$

where $\Delta$ denotes the RGB compensation data for each color, M1 denotes the first intermediate data, M2 denotes the second intermediate data, S denotes the saturation data of the HSV data, and St denotes a maximum value among saturation data included in the second range.

8. The method of claim 7, wherein the compensating for the second RGB data comprises applying the second RGB data with the RGB compensation data.

9. The method of claim 8, wherein the second RGB data is compensated according to, $$RoGoBo = RiGiBi + \Delta R\Delta G\Delta,$$

where RoGoBo denotes the compensated second RGB data, RiGiBi denotes the second RGB data, and $\Delta R\Delta G\Delta B$ denotes the RGB compensation data.

10. The method of claim 1, wherein the rendering of the first RGB data and the converting of the first RGB data into the HSV data are executed simultaneously.

11. The method of claim 1, wherein the compensated second RGB data and the W data respectively correspond to the red, green, blue, and white sub-pixels.

12. An image processing apparatus for processing first red, green, and blue (RGB) data with a display device comprising a pixel including red, green, blue, and white sub-pixels and providing the processed data, the apparatus comprising:
  a rendering unit configured to render the first RGB data to generate second RGB data and white W data;
  an RGB-HSV converting unit configured to convert the first RGB data into hue, saturation, and value (HSV) data;
  a calculating unit configured to obtain RGB compensation data by using the HSV data on the basis of a lookup table, wherein the lookup table stores first and second intermediate values corresponding to each of a plurality of levels of the value data of the HSV data for each color; and
  a color compensating unit configured to compensate for the second RGB data by using the RGB compensation data and to output the compensated RGB data and the W data.

* * * * *